(12) United States Patent
Shi et al.

(10) Patent No.: US 11,260,406 B2
(45) Date of Patent: Mar. 1, 2022

(54) INJECTOR

(71) Applicant: Delphi Automotive Systems Luxembourg SA, Bascharage (LU)

(72) Inventors: Junmei Shi, Trier (DE); Otto Muller-Girard, Jr., Rochester, NY (US)

(73) Assignee: DELPHI AUTOMOTIVE SYSTEMS LUXEMBOURG SA, Luxembourg (LU)

( * ) Notice: Subject to any disclaimer, the term of this patent is extended or adjusted under 35 U.S.C. 154(b) by 110 days.

(21) Appl. No.: 16/764,058

(22) PCT Filed: Nov. 13, 2018

(86) PCT No.: PCT/EP2018/081032
§ 371 (c)(1),
(2) Date: May 14, 2020

(87) PCT Pub. No.: WO2019/096767
PCT Pub. Date: May 23, 2019

(65) Prior Publication Data
US 2020/0384484 A1 Dec. 10, 2020

(30) Foreign Application Priority Data
Nov. 15, 2017 (GB) .................................. 1718840.0

(51) Int. Cl.
| | |
|---|---|
| *B05B 1/14* | (2006.01) |
| *B01D 53/94* | (2006.01) |
| *B05B 1/30* | (2006.01) |
| *F01N 3/20* | (2006.01) |
| *F02M 61/18* | (2006.01) |

(52) U.S. Cl.
CPC ............ *B05B 1/14* (2013.01); *B01D 53/9418* (2013.01); *B01D 53/9431* (2013.01); *B05B 1/302* (2013.01); *F01N 3/2066* (2013.01); *F01N 2610/1453* (2013.01); *F02M 61/1806* (2013.01)

(58) Field of Classification Search
CPC combination set(s) only.
See application file for complete search history.

(56) References Cited

U.S. PATENT DOCUMENTS

| | | | |
|---|---|---|---|
| 5,570,841 A | 11/1996 | Pace et al. | |
| 5,662,277 A | 9/1997 | Taubitz et al. | |
| 6,264,112 B1 * | 7/2001 | Landschoot | ....... F02M 51/0667 239/5 |
| 6,502,770 B2 * | 1/2003 | Dallmeyer | ......... F02M 51/0682 239/585.1 |

(Continued)

FOREIGN PATENT DOCUMENTS

| | | |
|---|---|---|
| JP | 690917 B1 | 8/2017 |
| WO | 2014000947 A1 | 1/2014 |

*Primary Examiner* — Binh Q Tran
(74) *Attorney, Agent, or Firm* — Joshua M. Haines

(57) ABSTRACT

A nozzle assembly includes a body, a valve member, and a clamp member maintaining a flow director member against the body. The flow director member is sandwiched between the peripheral wall and the clamp member, and is provided with an outlet path including two distinct guidance channels extending from an upstream end and a common downstream end where is a spray hole. The outlet path creates impingement of the two flow streams flowing in the two channels before entering the spray hole.

18 Claims, 4 Drawing Sheets

(56) References Cited

U.S. PATENT DOCUMENTS

| | | | |
|---|---|---|---|
| 9,638,080 B2* | 5/2017 | Cavanagh | F02M 61/162 |
| 10,473,014 B2* | 11/2019 | Qi | F01N 3/2066 |
| 2003/0121998 A1* | 7/2003 | Maier | F02M 61/162 |
| | | | 239/585.1 |
| 2003/0141387 A1 | 7/2003 | Xu | |
| 2005/0087630 A1 | 4/2005 | Sayar | |
| 2011/0163187 A1* | 7/2011 | Heyse | F02M 61/1853 |
| | | | 239/533.12 |
| 2014/0252132 A1 | 9/2014 | Jeannel et al. | |
| 2017/0089313 A1* | 3/2017 | Noguchi | F02M 61/162 |
| 2019/0293040 A1* | 9/2019 | Pobuda | F02M 61/18 |

\* cited by examiner

INJECTOR

CROSS REFERENCE TO RELATED APPLICATIONS

This application is a national stage application under 35 USC 371 of PCT Application No. PCT/EP2018/081032 having an international filing date of Nov. 13, 2018, which is designated in the United States and which claimed the benefit of GB Patent Application No. 1718840.0 filed on Nov. 15, 2017, the entire disclosures of each are hereby incorporated by reference in their entirety.

TECHNICAL FIELD

The present invention relates to a selective catalytic reagent (SCR) injector and more particularly to the nozzle assembly.

BACKGROUND OF THE INVENTION

Low pressure injectors are used to meter and atomize various liquids used in an internal combustion engine or its exhaust gas treatment components. Typically the injector also directs the atomized spray in an particular geometry towards a defined target. The spray droplet size and spray pattern geometry have a direct effect on the operational efficiency and output emissions of the internal combustion engine (ICE). The design of the injector must minimize deposit formation and have robust performance against the deposits that do form. Smaller spray particle can be created by increasing the number of holes in the director plate. At a given flow rate more holes means smaller holes and smaller spray particle size. There are practical limits to the size of the holes. Furthermore smaller holes are more prone to plugging. More holes increase the cost of the director plate as more machining operations are required to make the holes. In this invention we seek to minimize the number of holes necessary meet spray particle size requirements. This reduces cost and improves plugging resistance.

SUMMARY OF THE INVENTION

The invention is outlined for a low pressure liquid atomizer based on a Selective catalytic reduction (SCR) injector. Accordingly, it is an object of the present invention to resolve or at least mitigate the above mentioned problems in providing a nozzle assembly of an injector extending along a main axis and having
- a body with a peripheral wall enclosing an inner space and provided with a valve seat surrounding a first opening;
- a valve member, arranged in said inner space for cooperating with said valve seat,
- a clamp member wrapping and maintaining a flow director member against the body, said clamp member being provided with a second hole larger and surrounding the first opening and,
- the flow director member sandwiched between the peripheral wall and the clamp member, the flow director member having an inner face pressed against said peripheral wall covering said first opening and partially defining a sac and, an outer face pressed against the clamp member covering said second hole.

The flow director member is provided with an outlet path comprising two distinct guidance channels, formed on said inner face, the channels extending from an upstream end, opening in the sac and converging to a common downstream end, where a spray hole is drilled through the faces of the flow director member, said outlet path creating impingement of the two flow streams flowing in said two channels before entering the spray hole.

The first and second openings, or hole, may be circular and concentric.

The spray hole may comprise a large entry portion, forming a step hole, and a narrow exit portion.

In an embodiment, the large entry portion and the narrow exit portion may be coaxial.

In another embodiment, the large entry portion and the narrow exit portion may be decentred.

In an embodiment, the spray hole extends along a hole axis parallel to the main axis.

In an embodiment, the spray hole extends along a hole axis angled to the main axis.

At said common downstream end, the two channels may be aligned along a common axis facing one another.

The two distinct guidance channels may be U-shaped, the spray hole being provided at the convergence of the two legs.

Said spray hole may be centred in the guidance channels, the hole axis intersecting the axial line of the channels.

The large entry portion and narrow exit portion may be coaxial and are both offset relative to the axial line of the channels.

In an embodiment, the large entry portion is centred on the axial line of the channels and, the narrow exit portion offset relative to the axial line of the channels and to the large entry portion.

In another embodiment, the large entry portion is offset relative to the axial line of the channels and, the narrow exit portion offset relative to the large entry portion.

Also, $1.2 < D60/D61 < 2.0$ where,
- $D60$ being the diameter of the step hole and,
- $D61$ being the diameter of the exit portion of the spray hole.

The upstream ends of the two channels may open in a common central recess.

Said central recess may outwardly extend to the vicinity of the second boundary defined by the clamp hole, an obstacle feature being arranged in said recess between the spray hole and the first boundary defined by the opening of the body, said obstacle feature creating a channel on each of its two sides forcing the stream to divide into two sub-streams prior to enter the spray hole.

The spray hole is further defined as follow:
- $L54 < 0.1$ mm and,
- $D54 = 0.14 \pm 0.04$ mm wherein:
- $L54$ is the axial length of the spray hole and,
- $D54$ is the diameter of the spray hole.
- $k = (S52+S53)/S54$ based on $D61$ where,
- $S52$ is cross section of the first channel;
- $S53$ is the cross section of the second channel;
- $S54$ is the cross section of the spray hole $D61$ and wherein,
- $1.3 < k < 2.5$
- $k2 = d1/D54$ and,
- $d1$ is the distance from the spray hole axis to the limit of the clamp hole,
- $k2$ a number comprised between 0.8 and 2.0 and preferably between 1.0 and 1.3.
- $k3 = d2/D54$ and,
- $d2$ is the distance from the spray hole axis to the obstacle feature,
- $k3$ a number comprised between 1.0 and 2.0.

The nozzle assembly may comprise a plurality of outlet paths.

All spray holes may be substantially equidistant from the main axis.

The invention further extends to an injector comprising a nozzle assembly as described above.

In a particular embodiment, said injector may be a SCR injector adapted to spray a reagent fluid in the exhaust pipe of an internal combustion engine.

In another embodiment, said injector may be a gasoline injector for spraying gasoline fuel in the cylinders of an engine.

In yet another embodiment, said injector is a water injector for spraying water.

BRIEF DESCRIPTION OF THE DRAWINGS

The present invention is now described by way of example with reference to the accompanying drawings in which.

DESCRIPTION OF THE PREFERRED EMBODIMENTS

Figure 1:
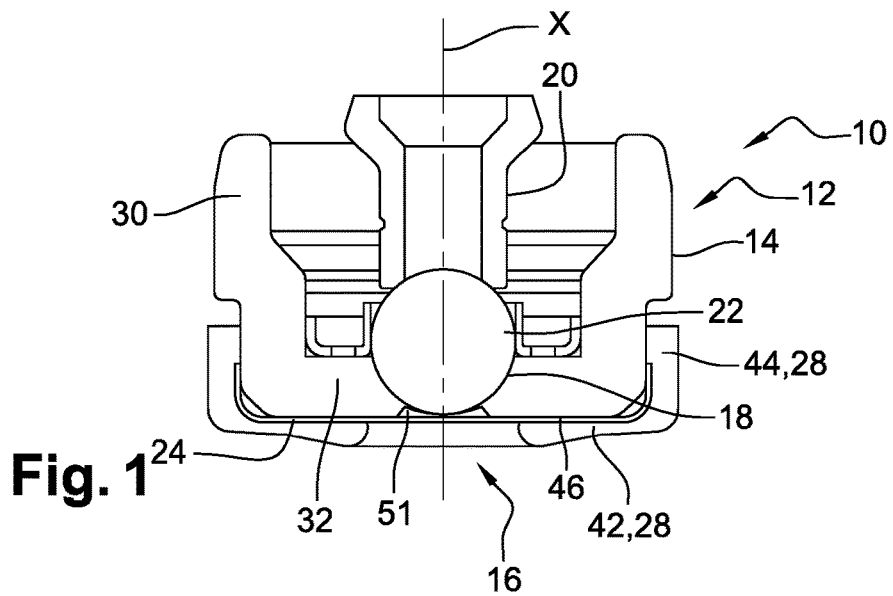
FIG. 1 is an axial section of the nozzle of a SCR injector as per the invention.

The invention described relates to the nozzle 10 of an injector 12 adapted to spray a liquid such as water, fuel, gasoline or a reagent under relatively low pressure. The description is based on the non-limiting example of a Selective Catalytic Reagent injector 12, hereafter SCR injector 12, adapted to be arranged to spray a reagent in the exhaust pipe of an internal combustion engine.

In reference to FIGS. 1 to 4 is described a nozzle assembly 10 of a Selective Catalytic Reagent injector 12, hereafter SCR injector 12, adapted to be arranged to spray a reagent in the exhaust pipe of an internal combustion engine. Said nozzle assembly 10 extends along a main axis X and it comprises a body 14, defining a circular opening 16 surrounded by a seat 18, a valve member comprising a pusher 20 and a ball 22 cooperating with said seat 18, a flow director member 24 defining a plurality of reagent outlet paths 26, said flow director member 24 being fixed to the body 14 by a clamp member 28.

In use, the pusher 20 is moved along said main axis X by an actuator, not shown, between a closed position where the pusher 20 urges the ball 22 against the seat 16 and, an open position where the pusher retracts enabling the ball 22 to lift off the seat and to open between the ball and the seat a passage for the reagent to be sprayed via the outlet paths 26.

More precisely, the body 14 defines an inner space surrounded by a cylindrical peripheral wall 30 closed at an end by a transverse wall 32 centrally provided with said circular opening 16. The seat 18 is a frustoconical face defined at the periphery of said opening 16 and provided on the inner face of said transverse wall 32. Alternatively to conical faces, other geometries such as a curved profile can be chosen.

Figure 4:
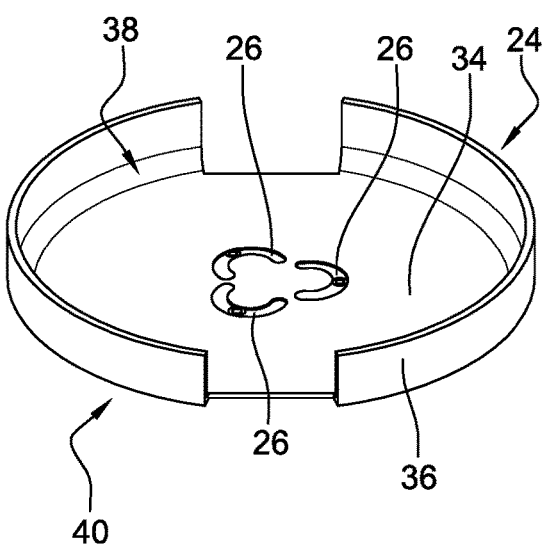
FIG. 4 is a 3D view of a first embodiment of a flow director member of the nozzle of FIG. 1.

The flow director member 24, particularly shown on FIG. 4, is a thin metal sheet shaped to define a main circular flat area 34 with two peripheral two raised lips 36 separated by opposed openings. The flow director member 24 has an inner face 38, visible on FIG. 4, opposed to an outer face 40 which central area is visible on FIG. 2. In the embodiment presented, three outlet paths 26, further detailed afterward, are arranged in the central area of said main circular area 34 although in a non-represented alternative, a SCR injector can be provided with another quantity of outlet paths.

The clamp member 28 is also a metal sheet with a flat area 42 and a peripheral raised lip 44, the flat area 42 being provided with a large central circular hole 46.

As shown on the axial section of FIG. 1, the flow director member 24 is sandwiched between the body 14 and the clamp member 28, the clamp lip 44 being crimped against the cylindrical wall 30 of the body and, the flat area 34 of the flow director member is urged against the outer face of the body transverse wall 32.

Figure 2:
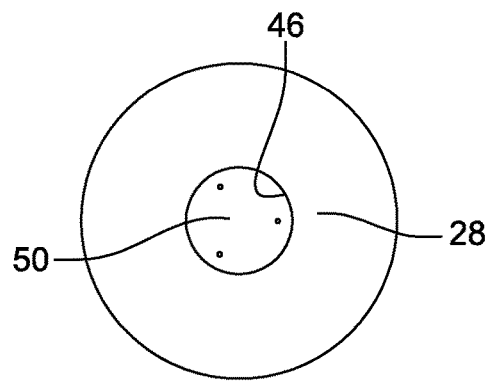
FIG. 2 is a bottom view of the nozzle of FIG. 1.
Figure 3:
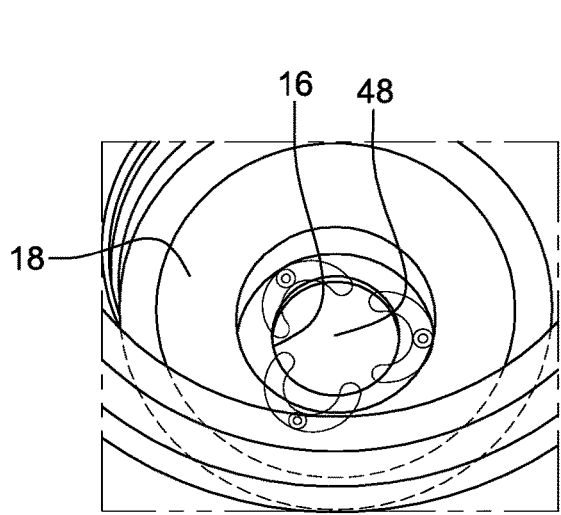
FIG. 3 is an 3D-top view of a first embodiment of the nozzle of FIGS. 1 and 2.

Through the opening 16 of the body is visible on FIG. 3 an inner central circular portion 48 of the inner face 38 of the flow director member and, through the hole 46 of the clamp member is visible on FIG. 2 an outer central circular portion 50 of the outer face 40 of the flow director member, said inner and outer central portions 48, 50 being concentric about the main axis X. Also, as shown on the section of FIG. 1, the body opening 16 is smaller than the clamp member hole 46 therefore said inner central circular portion 48 is smaller than the outer central circular portion 50 of the flow director member. Moreover, a flat volume, identified as a sac 51, is defined in the opening 16 of the body, between the ball 22 and said inner central circular portion 48 of the inner face 38 of the flow director member.

The outlet paths 26 enabling in use the reagent fluid to be expelled out of the injector 12 are defined on the flow director member. Each of said path 26 comprises two guidance channels 52, 53 converging to a spray hole 54. Said two guidance channels form together a U-shaped groove dug on the inner face 38 of the flow director member, each of the channels forming a vertical leg of the U, the spray hole 54 being drilled at the joining area. Each channel of said U-shaped guidance channels outwardly extends from an upstream portion 56, 57 that is in said inner central portion 48 of the flow director member, therefore forming an open groove opening in the sac 51 to, a downstream portion 58, 59 that is outside said inner central portion 48, said downstream portion 58, 59 being therefore covered by the transverse wall 32 of the body and forming a closed conduit. In an alternative not shown, the depth of the channel cross section area can gradually increase from upstream to downstream in order to accelerate the flow.

As said two downstream portions 58, 59 converge to an area where said spray hole 54 is drilled extending through the flow director member 24 along a hole axis A54 between an opening at in the bottom of said area to an opposed exit end in said outer central circular portion 50 of the outer face of the flow director member.

In use, reagent flows in each of the channels 52, 53 and the outlet path 26 is arranged for said two flows to impinge one another and generate turbulences prior to enter the spray hole 54.

Figure 5:
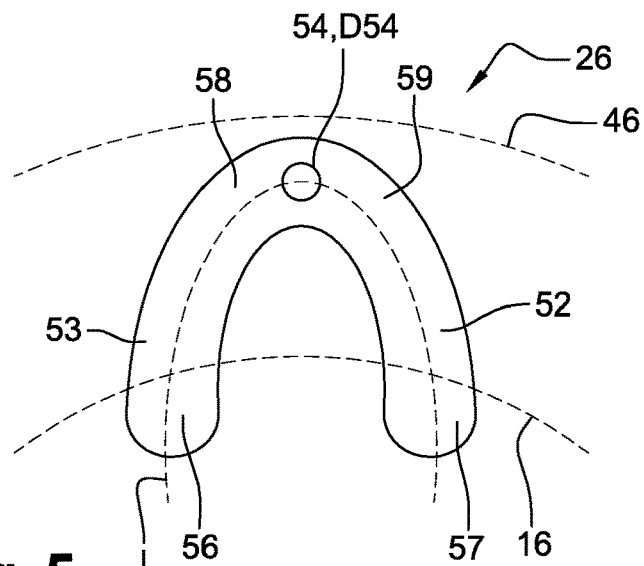
FIG. 5 is a top views of a first alternative of said first embodiment of the invention.

In a first alternative shown on FIG. 5, the spray hole 54 is drilled on the axial line L of the channels 52, 53. As visible on said figure the two downstream portions 58, 59 of the channels converge face-to-face to generate said impingement of the flows.

Figure 6:
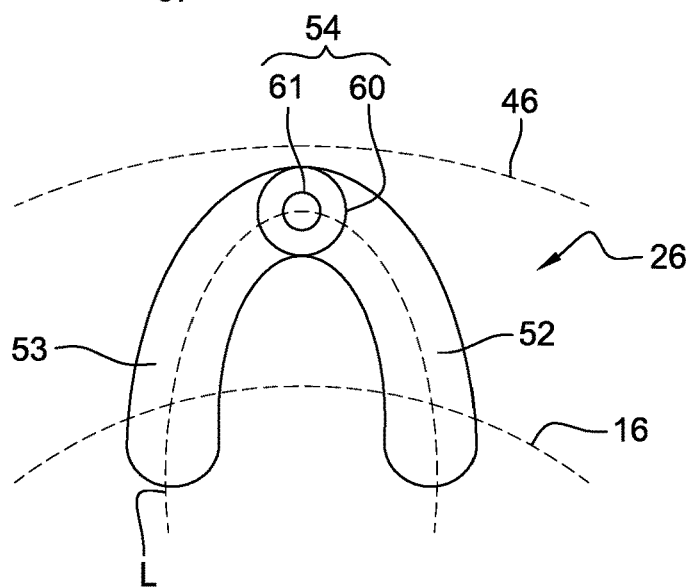
FIGS. 6 and 7 are a top view and an axial section of said first embodiment of the invention.
Figure 7:
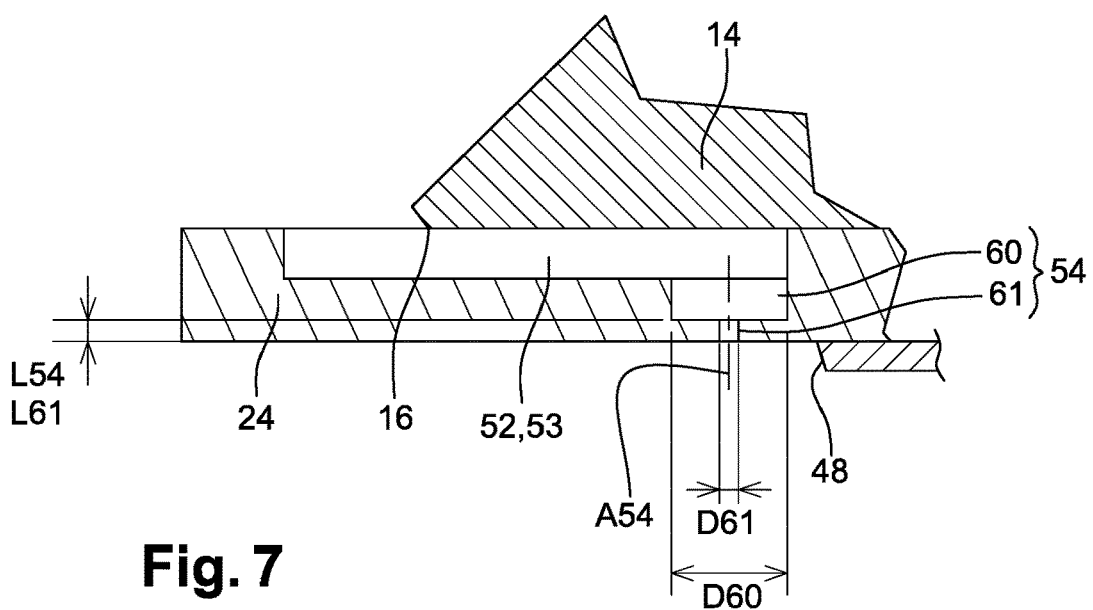

In a second alternative shown on FIGS. 6 and 7, the spray hole 54, drilled on said axial line L, comprises a large entry portion forming a recess 60 or step hole, at the bottom of which is drilled a calibrated narrow exit portion 61.

Figure 8:
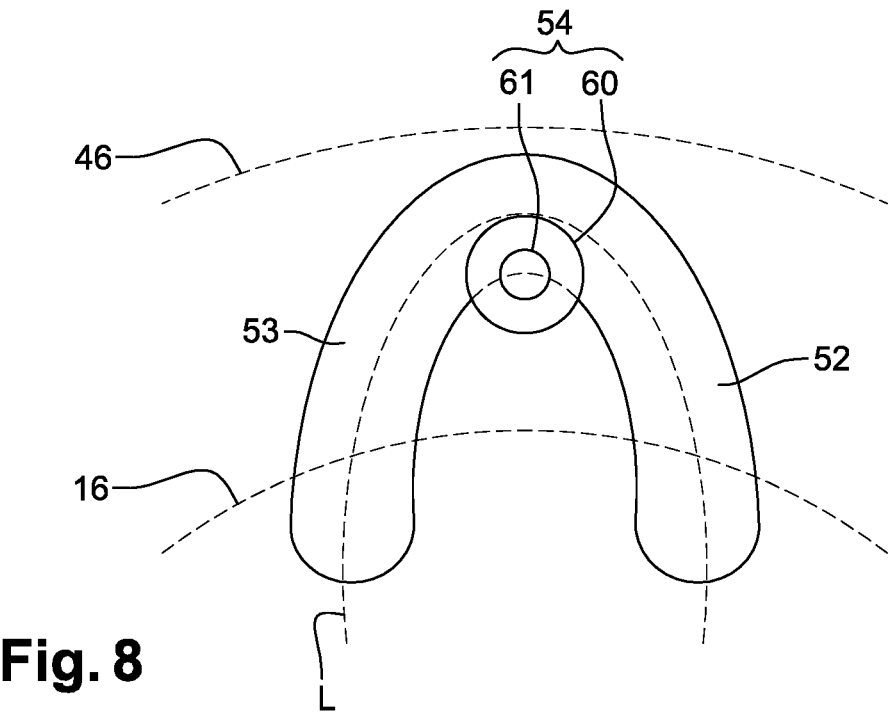
FIG. 8 is a top views of a third alternative of said first embodiment of the invention.

In a third alternative shown on FIG. 8, the spray hole 54 comprising the entry recess 60 and the narrow exit 61 is inwardly offset from said channels axial line L and is arranged closer to the inner body opening 16.

Figure 9:
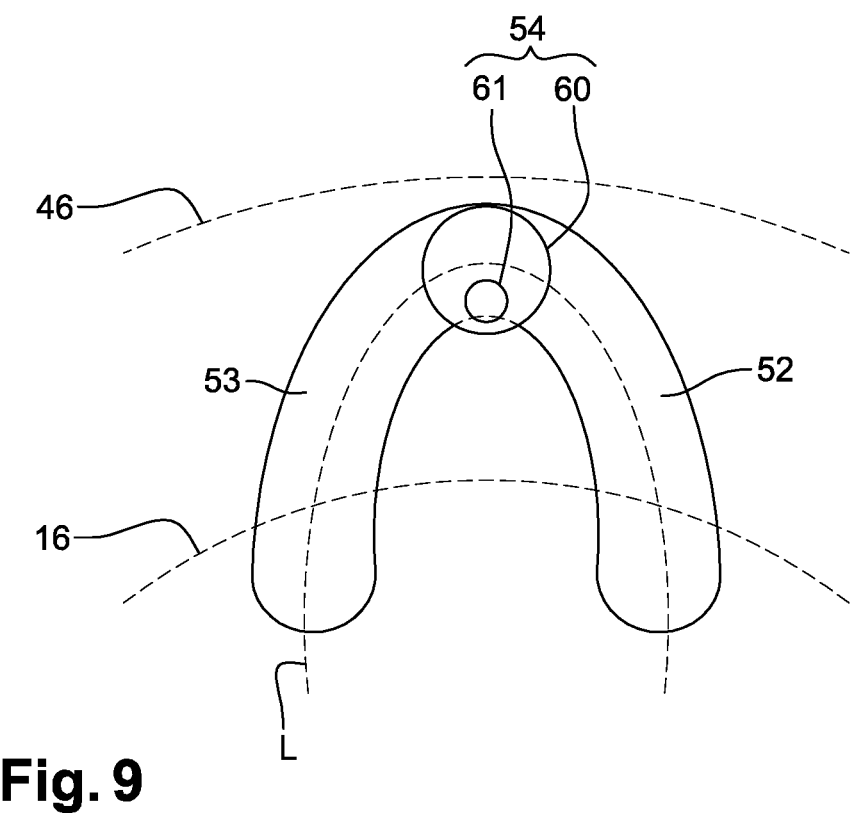
FIG. 9 is a top views of a fourth alternative of said first embodiment of the invention.

In a fourth alternative shown on FIG. 9, the step hole 60 is centred on said channel axial line L and the narrow exit 61 is inwardly decentred relative to the step hole 60 drilled closer to the inner body opening 16.

In alternatives, not shown and benefiting from the present invention, the injector is provided with more, or less, than three outlet path 26. Said path 26 are either regularly arranged, as shown in the examples, or non-regularly arranged. Also, the spray hole 54 shown to extend parallel to the main axis X may be arranged at an angle.

Figure 10:
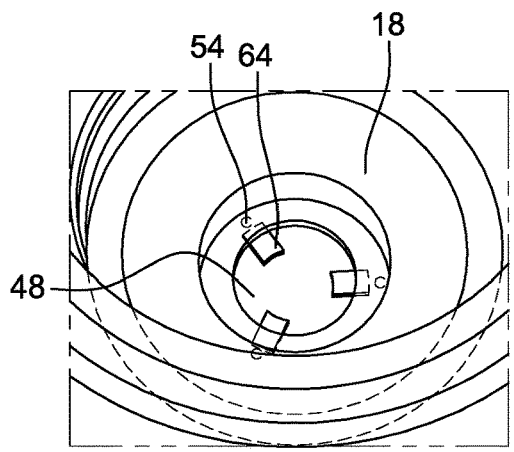
FIG. 10 is an 3D-top view of a second embodiment of the nozzle of FIG. 1.
Figure 11:
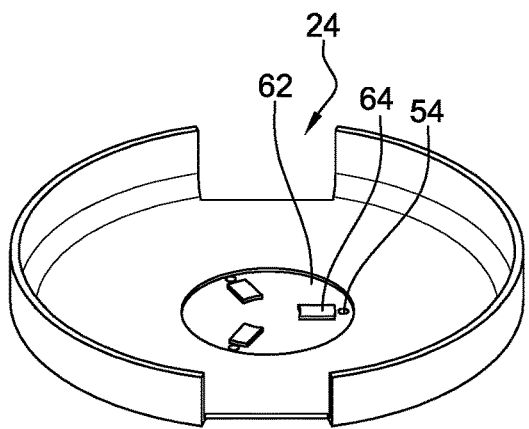
FIG. 11 is a 3D view a flow director member of the nozzle of FIG. 10.
Figure 12:
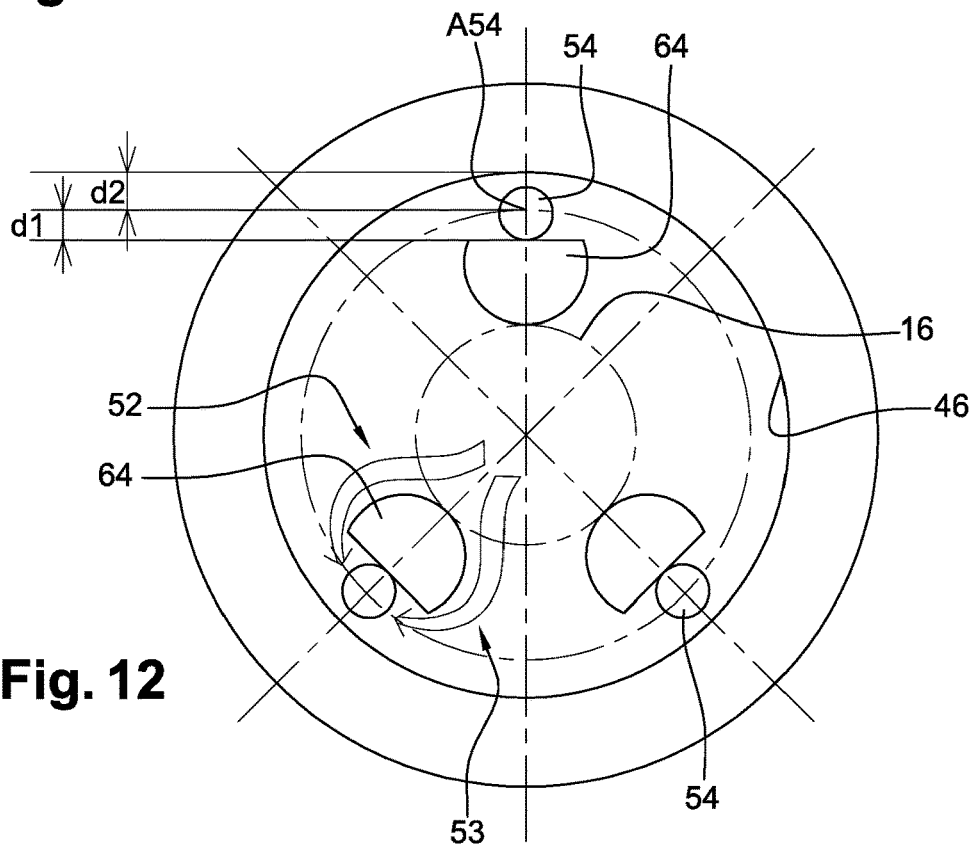
FIGS. 12 and 13 are a top view and an axial section of the second embodiment of the invention.
Figure 13:
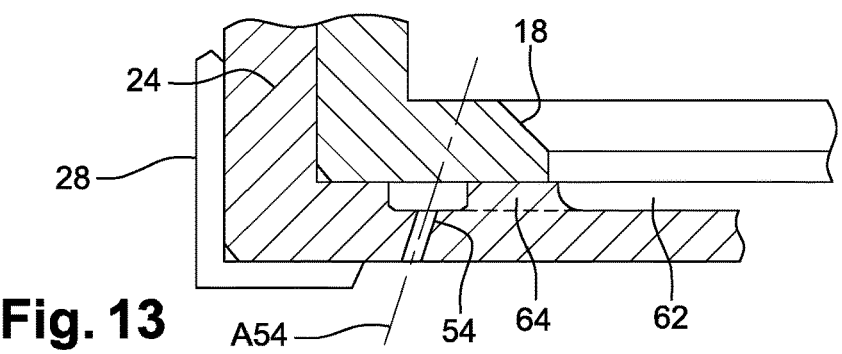

In a second embodiment the outlet path 26 are still arranged to have two flows impinging and generating turbulences prior to enter the spray hole 54 and, as shown on the FIGS. 10 to 13, the flow director member 24 is provided with a central shallow recess 62 larger than the body opening 16 so that, when assembled as it is represented on the semi-transparent view of FIG. 10, an annular peripheral portion of said recess 62 is covered by the transverse wall 32 of the body, the spray holes 54 being drilled in said covered peripheral portion. Moreover, the outlet path 26 comprises an obstacle feature 64 having a rectangular shape on FIG. 11 and a semi-circular shape on FIG. 12, said obstacle feature 64 being arranged in the recess 62 between the spray hole 54 and the boundary defined by the body opening 16, either extending in the sac 51 (FIGS. 10, 11), or just stopping at said boundary (FIG. 12), or even totally inside said covered area (not shown). In use, said obstacle feature 64 forces the flow to divide and flow around the obstacle in order to laterally reach the spray hole 54, the two halves of the flow impinging and generating turbulences prior to enter the spray hole 54. In this second embodiment, the two channels 52, 53 are formed by the lateral sides of the obstacle feature 64.

As said, the obstacle feature 64 can have any desired shape provided it forces the flow to divide. Moreover, in alternatives not show, the spray holes 54 may be provided with an entry step hole similar to the first embodiment and the hole axis A54 may be parallel or angled relative to the injector main axis X. Said alternative of angled hole axis A54 is possible with the first and with the second embodiment.

In a further alternative not shown, the central shallow recess 62 star shaped, a spray hole 54, with or without step hole, being drilled, coaxially or angled to the main axis X, at the end of each branch of the star and, an obstacle feature 64 being arranged in each branch to divide the flow.

Models having successful results have been performed on SCR injectors having the following dimensions:

A spray hole 54 provided with an entry step hole 60 and a narrow exit hole 61 is optimised when the following ratio is met:

$$1.2<D60/D61<2.0$$

D60 being the diameter of the step hole 60 and,
D61 being the diameter of the exit portion 61 of the spray hole.

Bests results have been obtained with short and narrow spray holes 54 where:
L54<0.1 mm and D54=0.14±0.04 mm,
L54 being the axial length of the spray hole and,
D54 being the diameter of the spray hole.

In the alternative where the spray hole comprises an entry step hole 60 and a narrow exit portion 61 then similar choices apply:
where: L61<0.1 mm and D61=0.14±0.04 mm,
L61 being the axial length of the exit portion and,
D61 being the diameter of the exit portion.

It has also been found that reagent spray improves with an appropriate selection of the sections of the outlet path:

$$k<(S52+S53)/S54 \text{ (or } S61\text{) where,}$$

S52 is cross section of the first channel;
S53 is the cross section of the second channel;
S54 is the cross section of the spray hole;

S61 is the cross section of the exit portion and wherein, $$1.3<k<2.5$$

The location and size of the spray hole 54 also influences the spray quality:

$$k2=d1/D54 \text{ or } k2=d1/D61 \text{ and,}$$

d1 is the distance from the spray hole axis A54 to the limit of the clamp hole 46, and wherein $$0.8<k2<2.0$$

and preferably 1.0<k2<1.3.

The following ratio further benefits the reagent spray:

$$k3=d2/D54 \text{ where,}$$

d2 is the distance from the spray hole axis A54 to the obstacle feature 64, k3 a number comprised between 1.0 and 2.0.

LIST OF REFERENCES

X main axis
A54 spray hole axis
L axial line
D54 diameter
D60 diameter
D61 diameter
L54 length
10 nozzle assembly
12 SCR injector
14 body
16 opening
18 seat
20 pusher
22 ball
24 flow director member
26 outlet path
28 clamp member
30 cylindrical wall
32 transverse wall
34 flat area of the flow director member
36 raised lip of the flow director member 38 inner face of the flow director member
40 outer face of the flow director member
42 flat area of the clamp
44 raised lip of the clamp
46 hole in the clamp
48 inner central circular portion of the inner face of the flow director member
50 outer central circular portion of the outer face of the flow director member
51 sac
52 guidance channel
53 guidance channel
54 spray hole
56 upstream portion
57 upstream portion
58 downstream portion
59 downstream portion
60 entry portion of the spay hole—recess—step hole
61 exit portion of the spray hole
62 shallow recess
64 obstacle feature

The invention claimed is:

1. A nozzle assembly of an injector extending along a main axis and comprising:
   a body with a peripheral wall enclosing an inner space and provided with a valve seat surrounding a first opening;
   a valve member arranged in said inner space for cooperating with said valve seat; and
   a clamp member wrapping and maintaining a flow director member against the body, said clamp member being provided with a second hole larger and surrounding the first opening;
   wherein the flow director member is sandwiched between the peripheral wall and the clamp member, the flow director member having an inner face pressed against said peripheral wall covering said first opening and partially defining a sac, and an outer face pressed against the clamp member covering said second hole;
   wherein the flow director member is provided with an outlet path comprising two distinct guidance channels formed on said inner face, the two distinct guidance channels extending from an upstream end opening in the sac and converging to a common downstream end where a spray hole extends through the inner face and the outer face of the flow director member, said outlet path creating impingement of two flow streams flowing in the two distinct guidance channels before entering the spray hole;
   wherein the spray hole comprises a large entry portion, forming a step hole, and a narrow exit portion; and
   wherein the large entry portion and the narrow exit portion are decentred.

2. A nozzle assembly as claimed in claim 1, wherein the first opening and the second hole are circular and concentric.

3. A nozzle assembly as claimed in claim 1, wherein the large entry portion and the narrow exit portion are coaxial.

4. A nozzle assembly as claimed in claim 1, wherein the spray hole extends along a hole axis parallel to the main axis.

5. A nozzle assembly as claimed in claim 1, wherein the spray hole extends along a hole axis angled to the main axis.

6. A nozzle assembly as claimed in claim 1, wherein at said common downstream end the two distinct guidance channels are aligned along a common axis facing one another.

7. A nozzle assembly as claimed in claim 6, wherein the two distinct guidance channels are U-shaped, the spray hole being provided at a convergence of two legs of the U-shape.

8. A nozzle assembly as claimed in claim 7 wherein said spray hole is centred in the two distinct guidance channels and wherein the spray hole extends along a hole axis intersecting an axial line of the two distinct guidance channels.

9. A nozzle assembly as claimed in claim 6, wherein the large entry portion and the narrow exit portion are coaxial and are both offset relative to an axial line of the channels.

10. A nozzle assembly as claimed in claim 6, wherein the large entry portion is centred on an axial line of the two distinct guidance channels and the narrow exit portion is offset relative to the axial line of the channels and to the large entry portion.

11. A nozzle assembly as claimed in claim 6, wherein the large entry portion is offset relative to the axial line of the two distinct guidance channels and the narrow exit portion is offset relative to the large entry portion.

12. A nozzle assembly as claimed in claim 1, wherein:

$$1.2 < \text{diameter of large entry portion/diameter of narrow exit portion} < 2.0.$$

13. A nozzle assembly as claimed claim 1, wherein the upstream ends of the two distinct guidance channels open in a common central recess.

14. A nozzle assembly as claimed in claim 13, wherein said common central recess outwardly extends to the vicinity of a second boundary defined by the second hole, an obstacle feature being arranged in said common central recess between the spray hole and a first boundary defined by the first opening of the body, said obstacle feature creating a channel on each of its two sides forcing the stream to divide into two sub-streams prior to entering the spray hole.

15. A nozzle assembly as claimed in claim 1, comprising a plurality of outlet paths.

16. A nozzle assembly as claimed in claim 15 wherein all spray holes are substantially equidistant from the main axis.

17. An injector comprising the nozzle assembly as claimed claim 1.

18. An injector as claimed in claim 17 adapted to spray a reagent fluid in an exhaust pipe of an internal combustion engine.

* * * * *